United States Patent [19]

Rigden

[11] 4,168,402
[45] Sep. 18, 1979

[54] ELECTRONIC TRUNK SELECTOR

[75] Inventor: Paul Rigden, Toronto, Canada

[73] Assignee: Pylon Electronic Development Company Ltd., Lachine, Canada

[21] Appl. No.: 867,277

[22] Filed: Jan. 5, 1978

[30] Foreign Application Priority Data

Jan. 19, 1977 [CA] Canada .................................. 270029

[51] Int. Cl.² .......................... H04Q 3/60; H04Q 1/24
[52] U.S. Cl. .......................... 179/18 FC; 179/175.2 D
[58] Field of Search .......... 179/18 FG, 18 G, 18 AH, 179/175.2 D, 18 FC

[56] References Cited

U.S. PATENT DOCUMENTS 3,422,399  1/1969  Haag et al. .................. 179/18 FC X
3,760,113  9/1973  Bouchet et al. ................ 179/18 FG Primary Examiner—William C. Cooper
Attorney, Agent, or Firm—Wenderoth, Lind & Ponack

[57] ABSTRACT

Modular electronic trunk selectors are known which have a number of incoming trunk modules and a common control module. Incoming trunks are connected to outgoing trunks by the common control module. The invention disclosed is a trunk selector of this type but it includes automatic testing and fault location. Periodic tests are randomly made of incoming trunks to see if correct signals are present on certain leads between the incoming trunk module and the common control module. Checks are also made for continuity and open circuit conditions on the switching paths at appropriate times. Tests are also made when regular calls are being set up. Detection of a fault initiates a "loop-back" in the common control module to see if the fault is in the incoming trunk module or the common control module and an appropriate alarm is activated.

13 Claims, 12 Drawing Figures

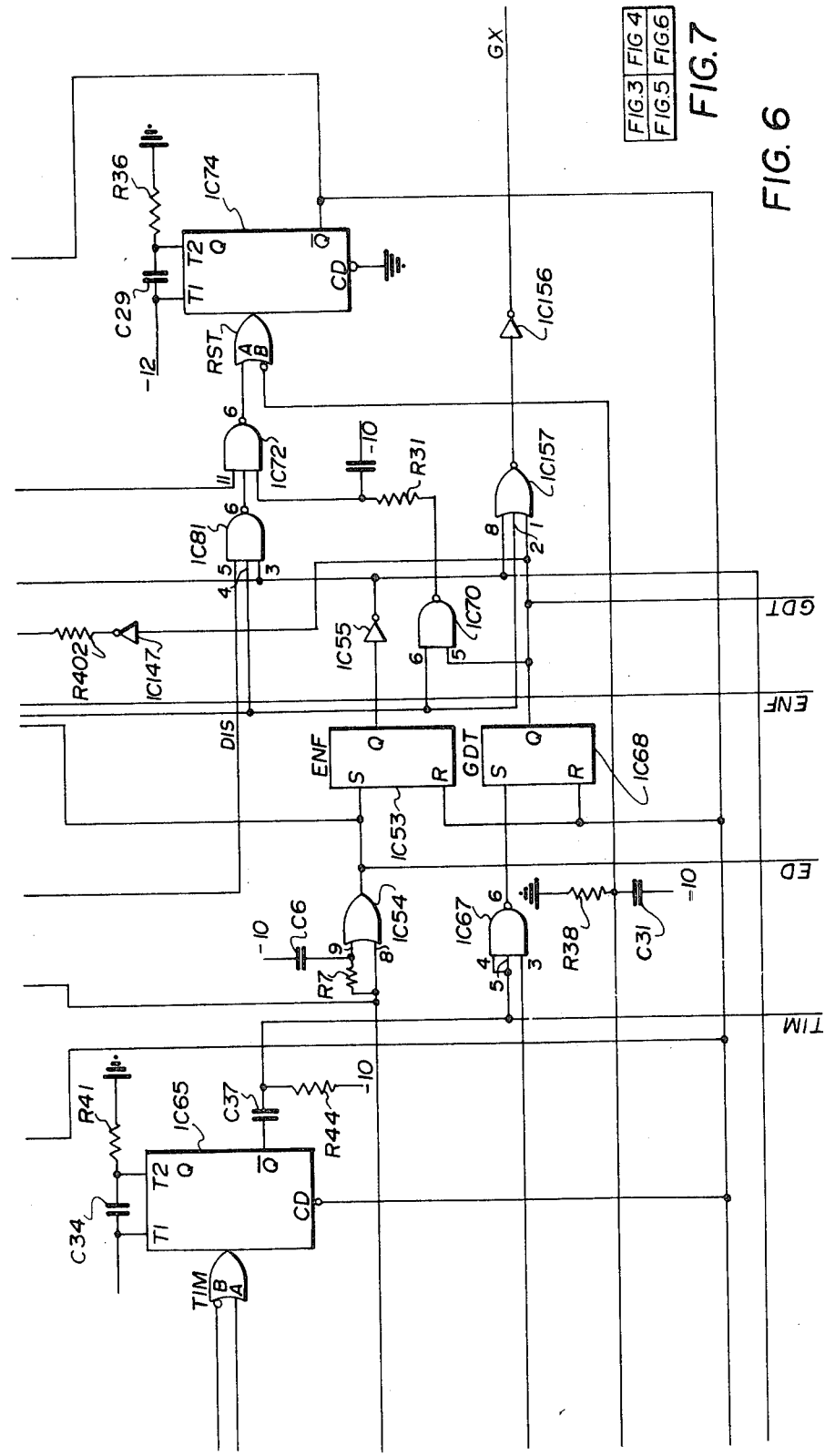

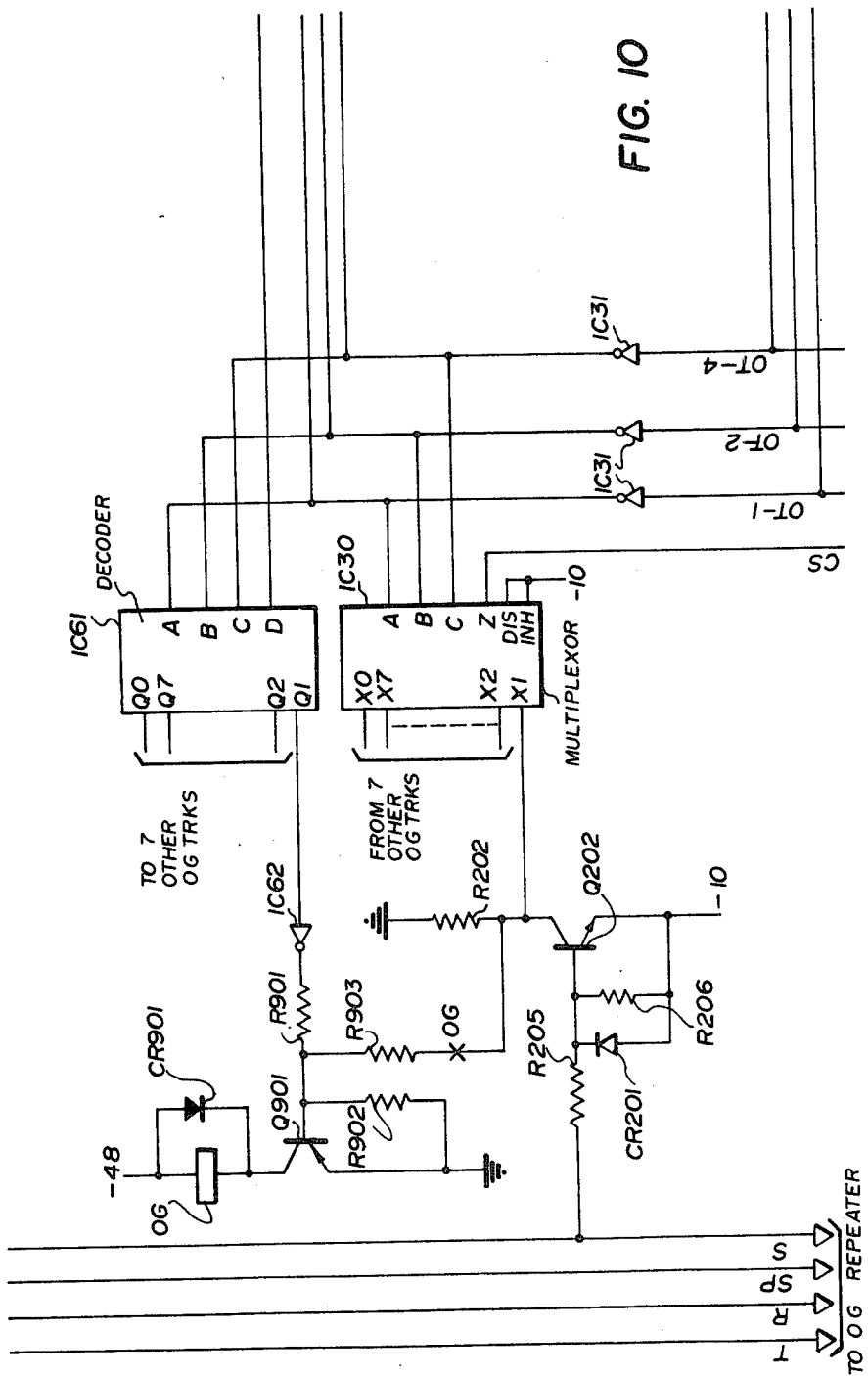

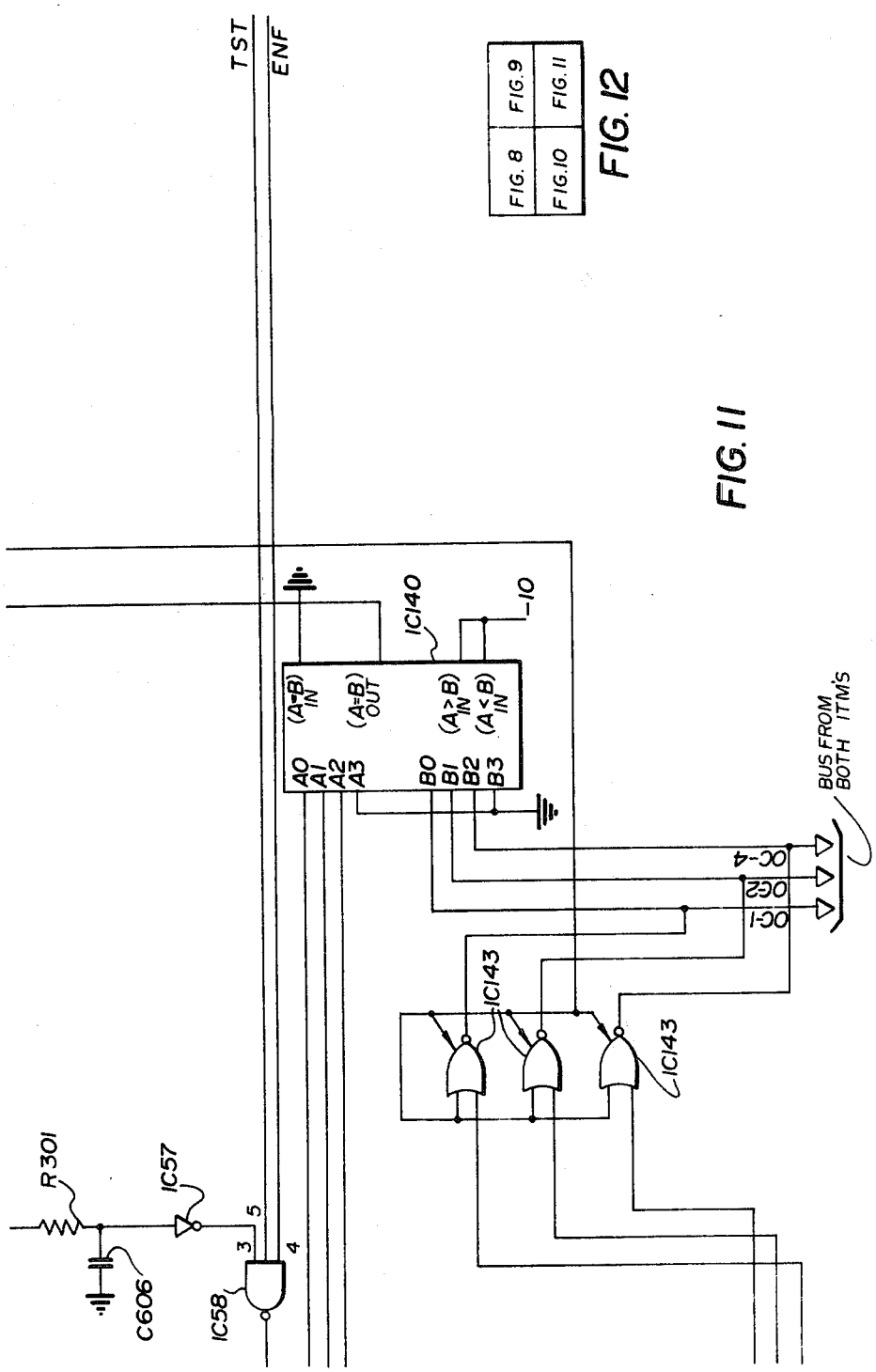

ELECTRONIC TRUNK SELECTOR

BACKGROUND OF THE INVENTION

This invention relates to an electronic trunk selector having automatic testing and fault location features.

Modular electronic trunk selectors are known which have a number of incoming trunk modules and a common control module. Each incoming trunk module may be provided with a plurality of incoming trunks and these are adapted to be connected to outgoing trunks by the common control module. The number of incoming trunks may be different from the number of outgoing trunks and normally there are more incoming trunks than outgoing trunks.

SUMMARY OF THE INVENTION

The present invention relates to an electronic trunk selector which includes automatic testing and fault location means and particularly to one of the type mentioned in the immediately preceding paragraph.

The electronic trunk selector may be used to increase the limited availability of step-by-step selectors and offer a space saving of about 50% over rotary out trunk units (ROTS) with much improved equipment and transmission performance.

Connection of inlet to outlet is by means of electronically controlled reed relays. The fast operating time of the equipment overcomes the problem of interdigital time and the equipment is free from steady state and impulse noise, factors favourable to data transmission. It is arranged for switching T,R,S leads, together with a spare.

The incoming trunk modules (ITM's) provide the switching matrix crosspoints for connecting incoming trunks to outgoing trunks and the call supervisory functions for each Incoming Trunk. Each ITM has logic circuitry for setting up a switching path in conjunction with the Common Control Module (CCM) and for controlling the switching matrix. Typically there are 2 ITM's per Trunk Selector.

The CCM provides the common control circuitry for setting up the switching paths in the Trunk Selector. It operates on instructions from the ITM's indicating Incoming Trunks requiring connection to Outgoing Trunks. It also provides control and supervisory circuits associated with each outgoing trunk and means for automatic testing and fault locating and the operation of corresponding alarm indications. There is only one CCM for each Trunk Selector.

In a typical configuration of trunk selector having twelve incoming trunks, there are two ITM's which could accommodate up to sixteen incoming trunks. All selectors have full access to eight outgoing trunks. Of course, this is merely exemplary and other configurations could be used.

In accordance with a broad aspect of the invention, there is provided an electronic trunk selector for selectively connecting any one of a plurality of incoming trunks to any one of a plurality of outgoing trunks, the incoming trunks being connected to at least one incoming trunk module (ITM) and the outgoing trunks being connected to a common control module (CCM), the CCM having means for sending to the ITM sequential addresses of incoming trunks and the ITM having means for sensing if an incoming trunk is requesting service and for sending to the CCM a signal on a first (RQ) lead to indicate that the incoming trunk is requesting service when that incoming trunk is addressed by the CCM and means for sending signals on a second (OC-DR) lead to the CCM regarding the busy/idle status of an addressed incoming trunk, said CCM having means for periodic random testing of idle incoming trunks whereby it causes the ITM to connect the idle incoming trunk to an idle outgoing trunk pre-selected by the CCM and checks the RQ lead to see if it indicates a request for service and checks the OC-DR lead to see if it indicates a busy status of the incoming trunk.

A preferred embodiment of the invention will now be described in conjunction with the accompanying drawings.

BRIEF DESCRIPTION OF DRAWING

FIGS. 3–6, which go together as shown in FIG. 7, comprise a block diagram of part of a common control module according to the invention and FIGS. 8–11, which fit together as shown in FIG. 12, comprise a block diagram of the remainder of the common control module.

DESCRIPTION OF THE PREFERRED EMBODIMENT

Figure 1:
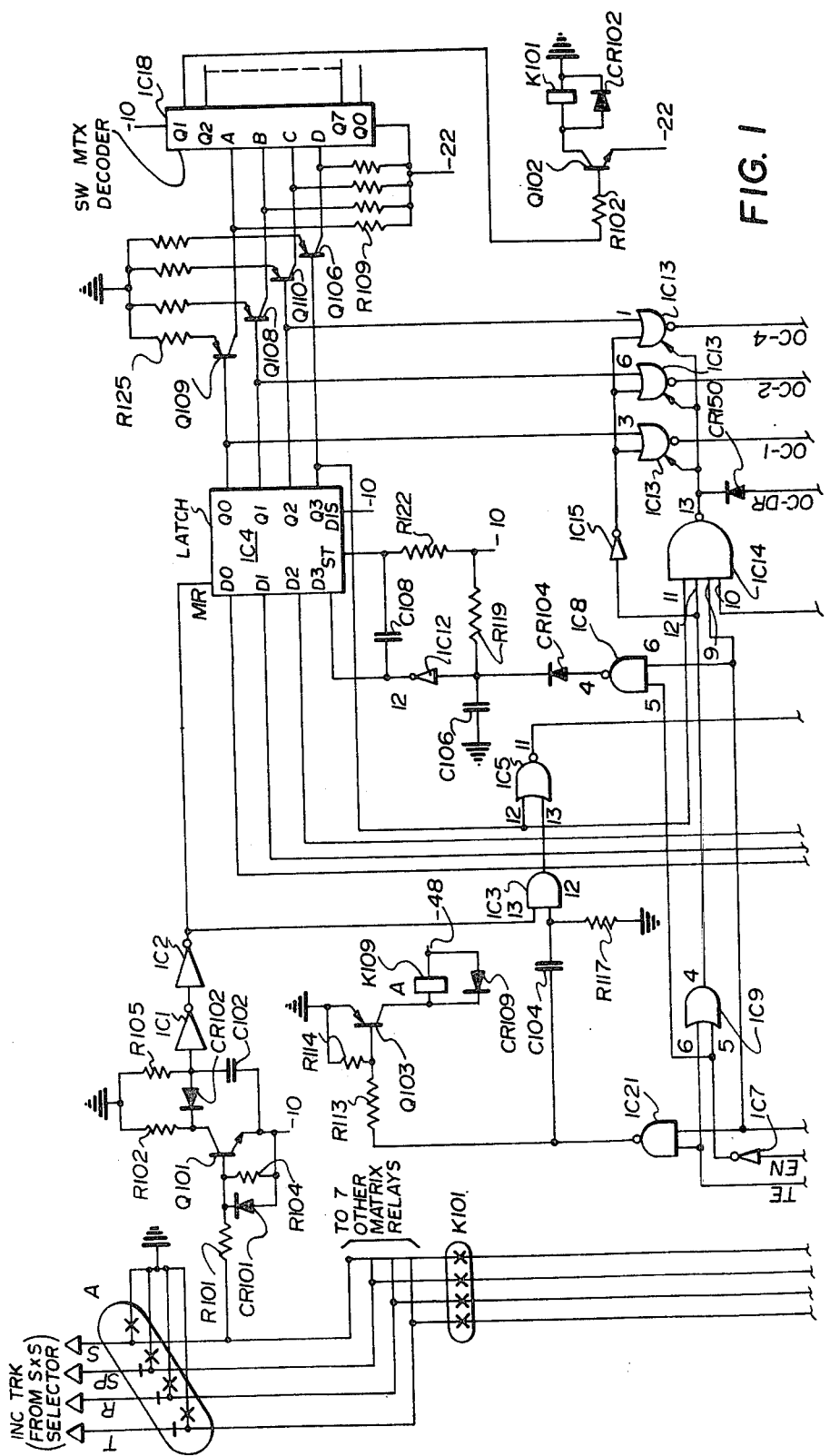
FIGS. 1 and 2 together, with FIG. 1 at the top and FIG. 2 at the bottom, comprise a block diagram of an incoming trunk module in accordance with the invention.

The incoming trunk module (ITM) shown in FIGS. 1 and 2 will be discussed first.

Seizure and setting up of a switching path results in a seizure request to the common control module (CCM). When a step-by-step (S×S) selector seizes an inlet (INC TRK) of the electronic trunk selector, it grounds the INC TRK "S" lead (top left of FIG. 1). This turns on transistor Q101 via resistor R101, transistor Q101 conducting via collector load resistor R102. The emitter of transistor Q101 is connected to −10 volts, as indicated on the drawing. Resistor R104 ensures that normally (in the idle state) transistor Q101 is held OFF. Diode CR101 prevents reverse breakdown of the base-emitter junction of transistor Q101 with −48 v on the "S" lead, −48 volts being a typical system voltage. Transistor Q101 when "ON" forward biases diode CR102 placing a logic "0" (−10v) on the input to inverter gate IC1. This produces via inverter IC2 a "0" on pin 13 of IC 3 and on the "Master Reset" (MR) of 4-bit latch IC4, removing the reset. Capacitor C102 and resistor R105 act mainly on RELEASE, which will be described subsequently. On seizure capacitor C102 discharges rapidly through diode CR102, introducing only a small delay.

A "0" on pin 13 of AND gate IC3 gives a "0" on pin 13 of IC5. Since latch IC4 was previously reset, its output Q3 is at a "0" and a "1" will be produced at the output of NOR gate IC5, giving a "1" to the input of multiplexer IC6 (FIG. 2) corresponding to that particular INC TRK. When the INC TRK counter in the common control module (to be described subsequently) reaches that INC TRK (i.e. binary address on leads IT-1,2,4 correspond to number of INC TRK in that ITM) the multiplexer IC6 routes the "1" from pin 11 of IC5 to its output pin (Z) and thence to the "RQ" lead to the CCM. The "disable" (DIS) input to IC6 from the "DIS" lead is normally "0"-not disabled.

Loading of an OG TRK address from the CCM will now be described.

When the CCM detects the request on the "RQ" lead, it sends back a "0" on the "EN" lead (lower left, FIG. 2) to that ITM in a manner described later. This produces a "1" via inverter IC7 on pin 5 of IC8 and on pin 5 of IC9. At the same time, the CCM will have stopped the INC TRK counter (to be discussed later) so that the address on the IT-1,2,4 bus leads (see FIG. 2) will cause decoder IC10 to put a "1" on pin 6 of IC8. (fourth bit "D" of decoder IC10 is "0"–"DIS" lead not activated–enabling decoder). This produces a "0" at the output of NAND gate IC8, reverse-biasing diode CR104. Capacitor C106 then charges through resistor R119. When the input of inverter IC12 reaches its switching threshold of about −5v, its output pin 12 goes to a "1" making input D3 of latch IC4 a "1" and producing a "strobe" pulse on the "ST" input of the latch IC4 via differentiator C108, R122. This strobe pulse causes the binary OG TRK address from the CCM on leads OT-1, 2, 4 to be loaded into latch IC 4 inputs D0, D1, D2 together with the "1" on input D3. These logic states appear immediately at the outputs Q0–Q3 of 4-bit latch IC4. The function of the delay circuit formed by CR104, C106, R119 is to slightly delay the leading edge of the "EN" pulse so that the information on the OT-1,2,4 leads has settled after OG TRK selection. It has little effect on the trailing edge since C106 discharges quickly through CR104. Latch bit D3/Q3 serves as a BUSY/IDLE indicator with Q3 being a "1" when the circuit is busy. As soon as Q3 goes to a "1" the "1" on the "RQ" lead to the CCM is removed, since the "1" on pin 12 of NOR gate IC5 forces pin 11 to a "0".

A return of BUSY indication and OG TRK address is returned to the CCM as confirmation. When latch IC4 has been loaded, the binary OG TRK address appears on input pins 3, 6, 1 of 3-state inverting gates IC13. The "0" on the "EN" lead produces a "1" on pin 12 of IC 14 and on the input of inverter IC 15, via inverter IC7 and OR gate IC9. There is a "1" on pin 9 of IC14 from the decoder IC10, a "1" on pin 11 from output Q3 on latch IC4 and a "1" on pin 10 via inverter IC16 (FIG. 2). This causes the output of NAND gate IC14 to go to a "0", placing a "0" on the "OC-DR" lead via forward biassed diode CR 150 to the CCM as a busy indication and removing the disable from 3-state gates IC13. At the same time, the output of IC15 is a "0", enabling the gates IC13 and causing an inverted version of the OG TRK address to be returned on the OC - 1,2,4 bus leads. On removal of the "EN" pulse, pin 12 of IC13 returns to a "0" and the address on the OC-1,2,4 bus and "0" on the OC-DR lead are removed. When the 3-state gates IC13 are disabled, the output becomes high - impedance (neither "0" nor "1") so that other gates may control the bus from other INC TRK Circuits.

Figure 2:
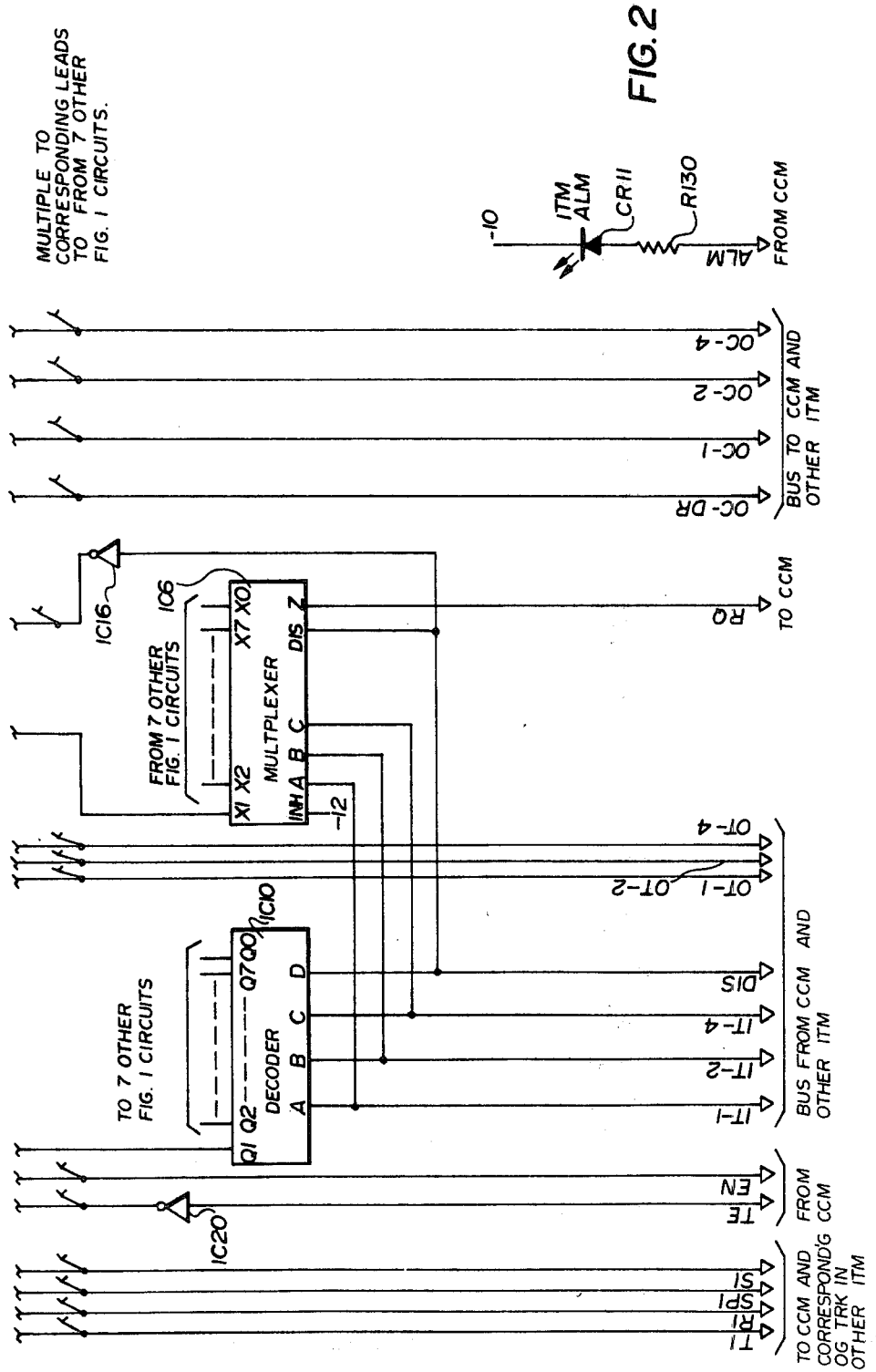

It should be noted that the circuitry shown in FIGS. 1 and 2 relates only to a single incoming trunk on an ITM. Most of the circuitry would thus be duplicated for the other seven trunks except for some common items such as the decoder IC10 and multiplexer IC6, as will be obvious.

Operation of the switching matrix (SW MTX) relay will now be described.

The OG TRK address and busy/idle bit from outputs Q0 to Q3 of latch IC4 also appear at the bases of transistors Q106, Q108, Q109 and Q110. Each transistor performs as an inverter and level translator. Transistors Q108 to Q110 present the address to the SW MTX decoder IC18. Transistor Q106 inverts the BUSY indication from Q3 and IC4 to give a "0" to the "D" input of the decoder IC18 which enables the decoder. Each transistor level translator works in the same manner and only Q109 will be discussed here. When Q0 from IC4 is at a "1" (ground), Q109 turns OFF so that input "A" to decoder IC18 is pulled to a "0" (−22v) by resistor R109. When Q0 is at a "0" (−10v), Q109 turns ON. Since approximately the same current flows through R125 and R109 (neglecting small base current), both resistors are chosen to be the same value. Then, approximately 11 volts will be dropped across each resistor, and input "A" to the decoder IC18 will be at a "1" (−11v). If OG TRK #1 has been selected by the CCM, Q1 of IC18 will go to a "1" (−10v) and transistor Q102 will turn ON via resistor R102, operating SW MTX relay K101. Diode CR102 protects transistor Q102 against back emf spikes on release of the circuit. The purpose of the level translators (from GND, −10v to −10v, −22v) is to allow nominal 24v relays to be used as opposed to 12v types which draw an undesirably high amount of current.

When the corresponding SW MTX relay operates, it connects the INC TRK T,R,S,SP leads through to the T1, R1, S1, SP1 leads of the OG TRK relay in the CCM (to be described later).

Release of the circuit occurs when the ground is removed from the "S" lead. Transistor Q101 turns off, reverse biasing CR102 so that capacitor C102 starts to charge through resistor R105. When the input of IC1 reaches the gate threshold of about −5 volts, its output pin goes to a "0", producing a "1" at the output of IC2. This resets the latch IC4 by the "MR" input, giving "0's" at all outputs Q0–Q3. Output Q3 (the BUSY/IDLE indicator) going to a "0" gives a "1" at input "D" of decoder IC18, disabling the decoder and so releasing the SW MTX relay that had been operated via transistor Q102, etc. The delay produced by CR102, C102 and R105 (in the order of 100 mS) ensures that the SW MTX relay is released *after* the OG TRK relay in the CCM, which starts releasing as soon as the "S" lead ground disappears, so that the SW MTX is not required to break away voltage or current, this being known in the art as "dry" switching.

Interrogation of the ITM by the CCM while the CCM is scanning for service requests is as follows.

When the CCM is scanning (i.e. scanner not stopped during setup of switching path), it places "0" pulses on the "TE" lead during the time it is looking at that ITM. Each time a new address is placed on the IT-1,2,4 leads to look at one of the eight INC TRKS in that ITM, a "0" pulse is placed on the "TE" lead and stays there for the first quarter period of the address duration. This produces a "1" pulse via inverter IC20 (FIG. 2) on one input of IC21 and on pin 6 of IC9. If the decoder IC10 is addressed to the same INC TRK, there will be a "1" on the other input of IC21 producing a "0" pulse via differentiator C104, R117 at pin 12 of AND gate IC3, thus giving a "0" pulse on pin 13 of IC5. If the INC TRK circuit is IDLE, there will be a "0" also on pin 12 of IC5 and a "1" pulse will be presented to the appropriate input of multiplexer IC6. Since the muliplexer IC6 is addressed to the same INC TRK, this "1" pulse is fed back immediately to the CCM on the "RQ" lead as an indication that the circuit is IDLE. If the circuit is BUSY, pin 12 of IC5 will be at a "1" forcing pin 11 to a "0" and inhibiting an "RQ" lead signal. The "1" pulse on pin 6 of IC9 will appear via the OR gate on pin 12 of IC14. Pin 11 of IC14 will be at a "1" from output Q3 of latch IC4, pin 9 will be at a "1" from the decoder IC10 and pin 10 will be at a "1" (circuit not disabled). Therefore the OG TRK address of the connected OG TRK and a "1" on the "OC-DR" lead will be returned to the CCM as a BUSY indication for the duration of the "TE" pulse. The operation of the 3-state gates IC13, etc., is the same as explained above.

The duration of the "TE" pulse is very short (about 25 s) so there is no tendency for the pulses at the output of IC21 to operate "A" relay K109 via transistor Q103.

Since both the decoder IC10 and multiplexer IC6 are used in producing the interrogation response, both are checked for failure of any input or output, as explained later.

The CCM automatically makes a "test" call as will now be explained.

When the CCM makes a test call, it stops its INC TRK counter, "freezing" the address on the IT-1,2,4 leads to the address of the INC TRK to be tested, and places a continuous "0" on the "TE" lead to the corresponding ITM. If the INC TRK circuit is idle, the leading edge of the "TE" lead "0" will produce an "RQ" lead response as described previously, but differentiator C104, R117 will ensure that it is still only a pulse that is returned to the CCM although the "TE" lead remains at a "0". IF the INC TRK circuit is busy, a busy indication will be returned as described previously, but the CCM will then reset the test sequence (to be described), immediately removing the "0" from the "TE" lead.

If the INC TRK is idle, the "TE" lead will stay at a "0" giving a "0" at the output of gate IC21 which then operates the "A" relay K109 via PNP transistor Q103 and resistor R113. Resistor R114 ensures that Q103 normally turns OFF properly. Diode CR109 protects transistor Q103 against voltage spikes from the relay K109.

When the "A" relay operates, it places grounds on all four INC TRK leads T, R, SP, S. It also breaks the T, R, SP leads back to the S×S selectors, but the ground on the S lead is returned as an indication that the inlet is busy, preventing seizure by the S×S while a test call is in progress.

The ground on the "S" lead also turns on transistor Q101 and a switching path is set up in exactly the same way as for a regular call, this action having been explained previously. When the path has been set up and the SW MTX relay K101 has operated, the CCM can test for the grounds on all four leads from the "A" relay, in a manner to be described subsequently.

At the end of a test call, the CCM returns the "TE" lead to a "1" causing the "A" relay to release. All grounds are then removed and the ground disappearing from the "S" lead causes the circuit to release as for a regular call.

It can be seen that all parts of the circuitry are checked during a test call, since the "A" relay places a ground on the "S" lead as for a regular call, so checking even the "S" lead monitor transistor, Q101. The CCM will diagnose a fault condition if it does not then receive a steady request signal on the "RQ" lead after allowing for sufficient delay for operation of the "A" relay.

Disabling of the ITM in a fault locating sequence and activation of an alarm indication will now be described.

When the CCM diagnoses a fault condition, it institutes a FAULT LOCATING SEQUENCE, in a manner to be described later, to determine whether the fault is in the CCM or the ITM.

The "DIS" lead to both ITM's is activated by placing a "1" on it. This disables the decoder IC10 (D input) and the multiplexer IC6 (Disable "DIS" input) and IC14 via input pin 10 and inverter IC16. Disabling the multiplexer IC6 prevents a request signal or interrogation response ("1") from being sent to the CCM on the "RQ" lead. Pin 10 of IC14 going to a "0" forces its output pin 13 to a "1", disabling 3-state gates IC13 and preventing both OG TRK address and a busy indication from being sent to the CCM on the OC-1, 2, 4, DR leads. Having removed all logic signals from the ITM's, the CCM can now "loop back" its own signals to the "RQ" and "OC-1. 2, 4, DR" leads to check whether the fault still persists or is cleared.

If "looping back" in the CCM clears the fault, then the fault must have been in the addressed ITM. In this case, the CCM operates a latch corresponding to the addressed ITM; this in turn places a "1" on the corresponding "ALM" lead, lighting the "ITM ALM" indicating LED CR111 via resistor R130 (FIG. 2). COMMON CONTROL MODULE (CCM)

Seizure and setting of a switching path and interrogation of an ITM is as follows.

Figure 5:
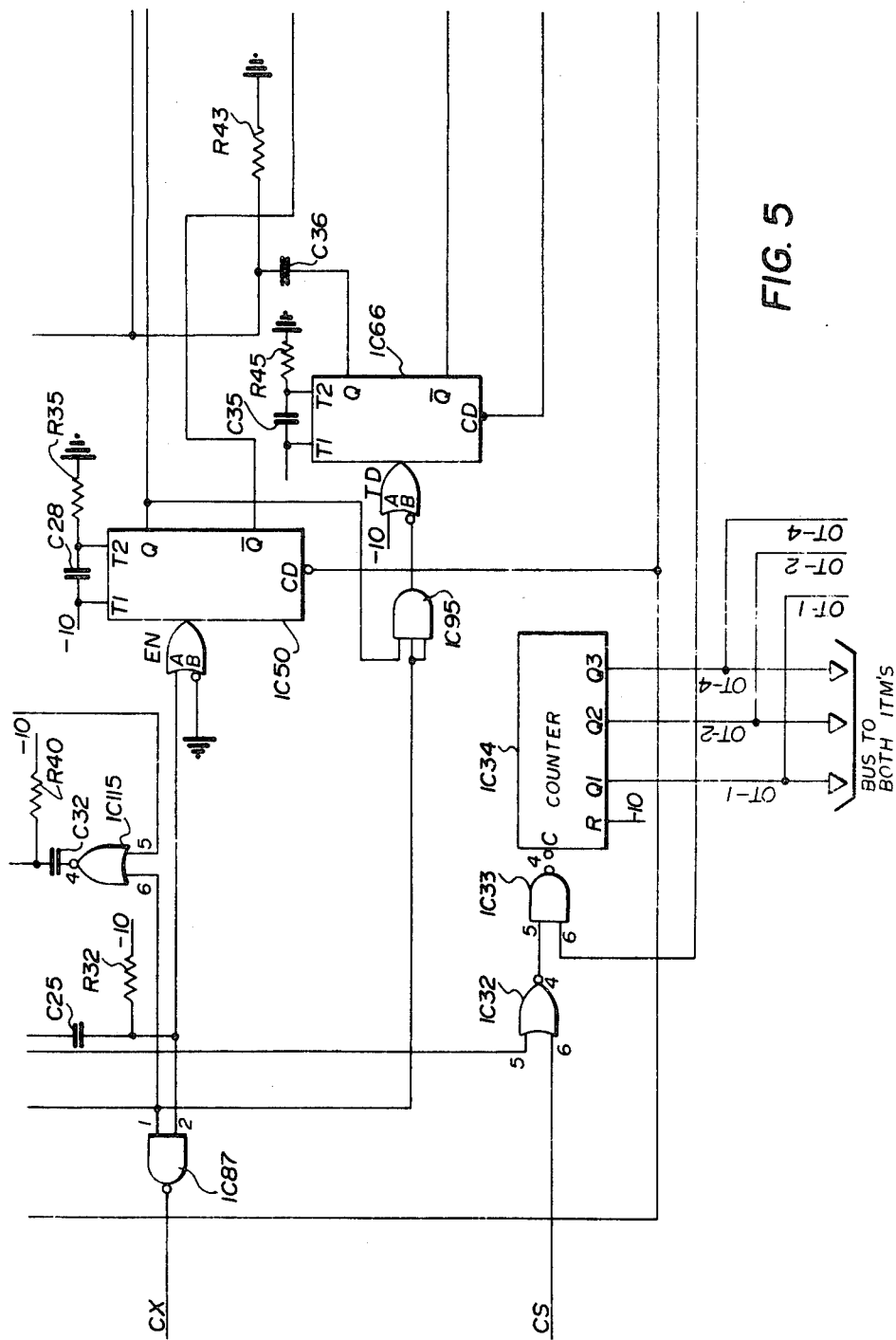

Prior to receiving a request for service from an ITM, an idle OG TRK will have been preselected in the following manner. Each OG TRK circuit is equipped with an "S" lead monitor transistor Q202 (FIG. 10). When the OG TRK is idle, there will be open or −48V on the "S" lead, keeping Q202 turned off. Resistor R206 ensures proper turn off, diode CR201 prevents reverse breakdown of the base-emitter junction. When the OG TRK is busy, a ground on the "S" lead turns transistor Q202 on by resistor R205. Resistor R202 is a collector load for transistor Q202. Multiplexor IC30 looks at the 8 OG TRK circuits under control of the binary address on the OT1, 2, 4 leads (inverted through gates IC31). The logic state at the addressed input is routed from the Z output to pin 6 of IC32 (FIG. 5) via the "CS" lead. The multiplexer IC30 (FIG. 10) is permanently enabled, both the "DIS" (disable) and "INH" (inhibit) leads connected to a logic "0" (−10v). If the address on the OT-1,2,4 leads corresponds to a BUSY OG TRK, then the "0" from Q202 will be routed to pin 6 of IC32 (FIG. 5). Pin 5 of IC32 is connected to a continuous source of clock pulses (explained below); therefore when the clock is at a "0" the output of IC32, connected to pin 5 of IC33, will go to a "1". Pin 6 of IC33 is at a "1" when the CCM is not setting up a switching path and a low going clock pulse will be produced from the NAND gate IC33 for the clock input to counter IC34. This will clock the counter IC34 to the next address, causing the multiplexer IC30 (FIG. 10) to look at the next OG TRK, by means of the OT-1, 2, 4 leads. If the next OG TRK is also busy, pin 6 of IC32 (FIG. 5) will remain at a "0" so that the counter will receive another clock pulse which pin 5 of IC32 goes to a "0" again. This scanning continues until an IDLE OG TRK is found, at which time pin 6 of IC32 goes to a "1" forcing pin 4 of IC32 to a "0" and pin 4 of IC33 to a "1". This cuts off the clock pulses from counter IC34, stopping the counter and "freezing" the address on the OT1, 2, 4 leads to the idle OG TRK.

Incoming trunk scanning and interrogation is as follows.

Figure 3:
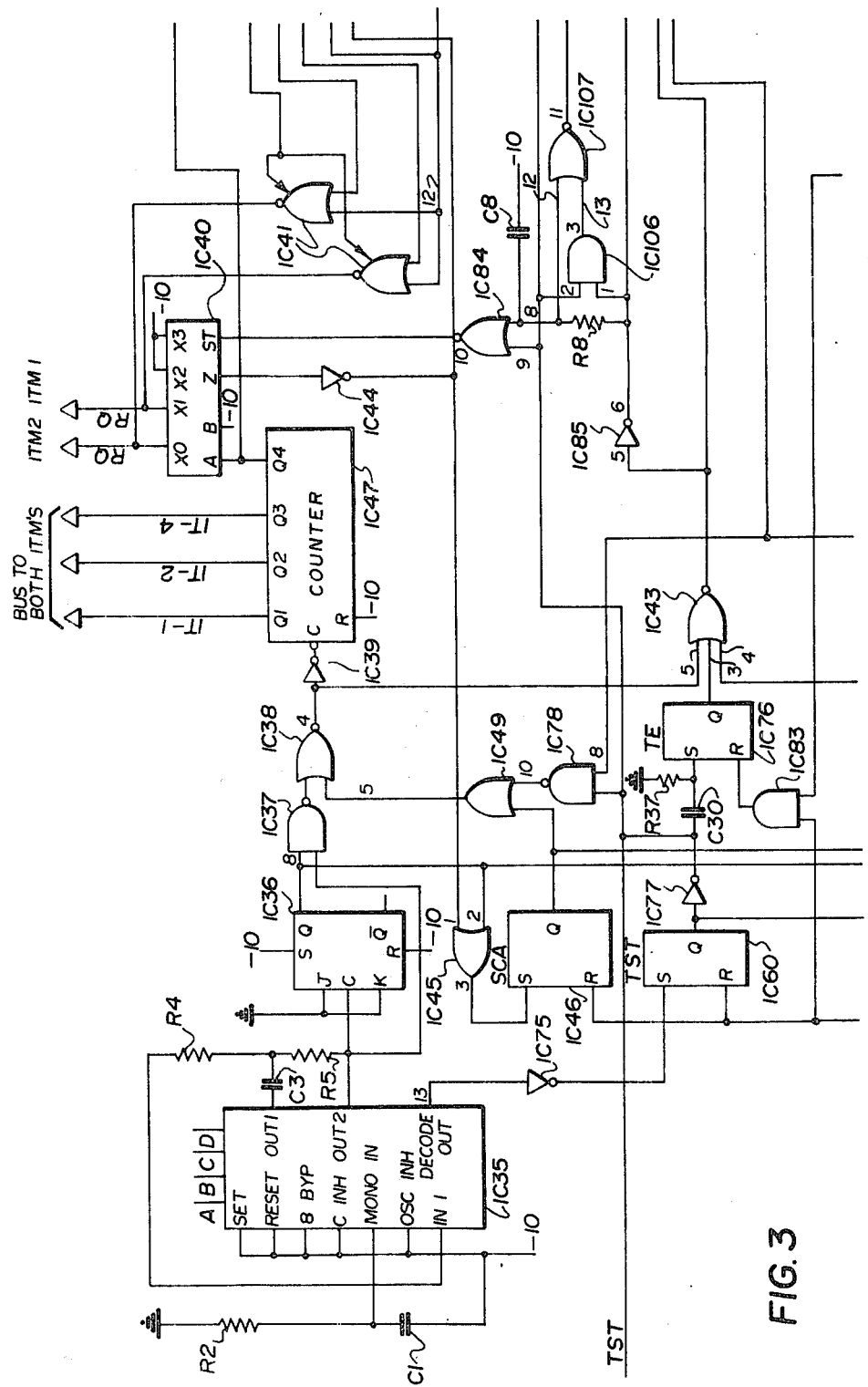

The CCM, while not setting up a switching path, is continuously scanning the "RQ" leads from the ITM's, looking for a service request. The main system clock is derived from "programmable timer" IC 35 (FIG. 3). This doubles as an oscillator for producing the clock pulses and a timer for determinimg the rate of automatic testing, discussed below. The clock oscillator frequency determining components are C3, R4, and R5 connected to the OUT 1, IN 1 and OUT 2 terminals and the square wave clock appears at OUT 2. From OUT 2, the frequency is halved by flip-flop IC36 connected in a standard J/K configuration as a toggle circuit that changes state every time the clock input (C) goes to a "1".

The output (Q) of IC36 is routed to pin 5 of OG TRK scanner gate IC32 (FIG. 5), and to pin 8 of IC37 (FIG. 3) where it is NANDed with the double frequency from OUT 2 of IC35. The output of IC37 only goes to a "0" when both inputs are at a "1"; the effect of this is to produce a pulse waveform with a period equal to that of the waveform from "Q" of IC36, but with a "0" pulse of the width equal to only a quarter of this period. Normally, pin 5 of IC38 is at a "0" and therefore these pulses appear at the clock input of incoming trunk counter IC47 via IC38 and inverter IC39. This continuously clocks the counter causing the binary address on the IT1,2,4 leads to the ITM's to be continuously changed so that the decoders and multiplexers in each ITM will successively look at each of the 8 trunks in that ITM in turn. The fourth bit of the counter IC47 is connected to the first address bit of several decoders and a multiplexer IC40. The second address bit is permanently strapped to a "0" so that each multiplexer and decoder looks at only 2 inputs or outputs. The multiplexer IC40 looks at the "RQ" leads from two ITM's, ITM1 and ITM2, connected to the X1 and X0 inputs respectively. When input "A" of the multiplexer IC40, connected to Q4 of the counter IC47, is at a "1", the "RQ" lead from ITM 1 is connected to the multiplexer output "Z"; when input "A" is at a "0", the "RQ" lead from ITM 2 is connected to "Z". IT can be seen that the CCM in this manner looks at all of the INC TRKS in one ITM, then switches to the other ITM to look at its INC TRKS. Normally (not in TEST SEQUENCE) the "strobe" input (ST) of the multiplexer IC40 is at a "0" meaning that the multiplexer is permanently enabled. When not in a FAULT LOCATING SEQUENCE, 3-state inverting gates IC41 are disabled, having no effect on the "RQ" leads. As the counter is scanning, the pulses on pin 4 of IC38 are also routed to the enable input (E) of decoder IC42 (FIG. 4) via NOR gate IC43 (FIG. 3). This routes "interrogation pulses" to the "TE" lead of the addressed ITM.

An enable instruction is sent to the ITM when a service request is received. When the counter IC47 reaches the address of an INC TRK requesting service, the corresponding "RQ" lead will go to a "1" which will be routed from the multiplexer IC 40 output via inverter IC44 to give a "0" at pin 1 of IC45. If the "1" on the "RQ" lead is a true service request—not just an interrogation response—then it will remain there until serviced by the CCM. Therefore, on the next clock half-cycle (Q output of IC36 goes to a "0") both inputs of OR gate IC45 will be at "0" and pin 3 will go to a "0", setting "SCA" latch IC46. This cuts off the clock pulses from the counter by placing a "1" on pin 5 of IC38 via OR gate IC49, forcing pin 4 of IC38 to a "0" and the clock input to a "1". The "1" on the "Q" output of IC46 also triggers the "EN" monostable IC50 (FIG. 5) on the "A" input via differentiator C26, R32.

When the "EN" monostable IC50 has been triggered, it produces a high-going pulse on its "Q" output and a low-going pulse on its "Q̄" output. The duration of each pulse is determined by C28, R35.

The "0" pulse from the Q̄ output of EN monostable IC50 enables decoder IC51, resulting in a similar pulse on the "EN" lead of the addressed ITM. The ITM should then load the pre-selected OG TRK address into its latches, return the address on OC1,2,4 as confirmation together with a busy signal on the OC-DR lead, remove the service request on the "RQ" lead and operate the SW MTX relay in the manner previously discussed. The "0" pulse on the "Q" output of EN monostable IC50 also sets the "ENF" latch IC53 (FIG. 6) via OR gate IC54. IC54 provides a small delay on the leading edge of the pulse since both inputs must go to a "0" before the output goes to a "0" and pin 9 is delayed by R7, C6. This delay is to match the same delay in the ITM (discussed previously) because the output of IC54 also connects to the fault locating circuitry discussed below. The ENF latch, when set, places a "0" via inverter IC55 on pin 6 of IC33, (FIG. 5), preventing any further clocking of the OG TRK counter IC 34 until the ENF latch IC53 has been reset (end of call set up). This prevents the counter IC34 from clocking to the next idle OG TRK as soon as the ground from the INC TRK "S" lead is switched to the OG TRK "S" lead (i.e. when the OG TRK relay operates).

Operation of the OG TRK relay and cut-through will not be discussed.

Figure 8:
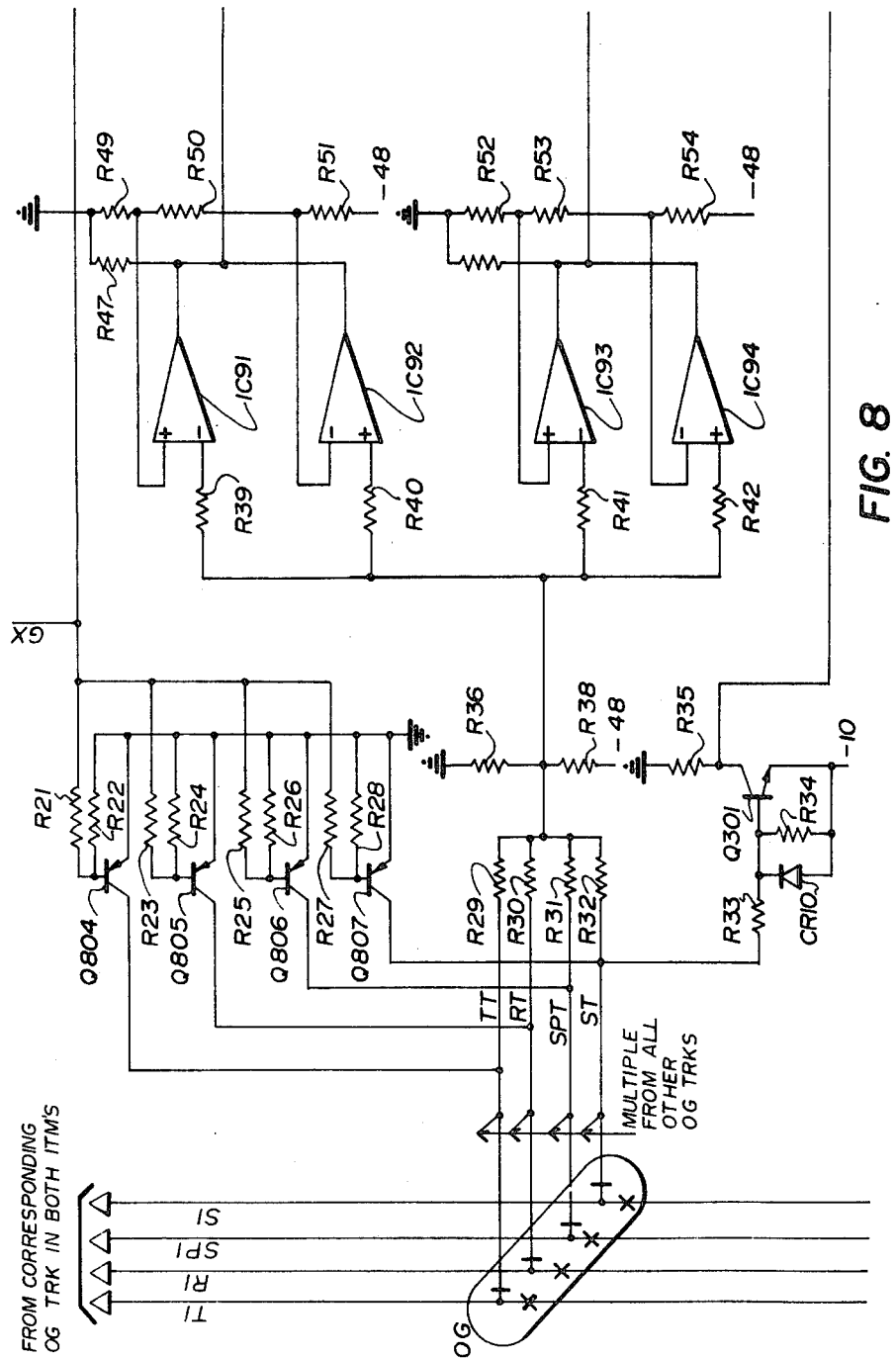

As soon as the SW MTX relay K101 in the ITM operates (FIG. 1), the ground from the INC TRK "S" lead is switched to the "S" lead of the corresponding OG TRK relay, and thence via the normally closed contacts to the "ST" lead multiple (FIG. 8). This turns on transistor Q301 via resistor R33 and collector load R35. Diode CR10 protects the base-emitter junction against any voltage more negative than −10V, and resistor R34 ensures proper turn-off. When transistor Q301 turns ON it puts a "0" on the input of inverter IC57 (FIG. 11) via resistor R301, giving a "1" on pin 3 of IC58. Since the "ENF" latch IC53 (FIG. 6) has been set, and the TST latch IC60 (FIG. 3) has not been set, there will be "1's" on pins 4 and 5 of IC58 (FIG. 11) and the output will go to a "0" enabling decoder IC61 (FIG. 10) from its "D" input. Since the decoder is addressed from the OT-1,2,4 leads via inverters IC31, it will place a "1" on the output corresponding to the selected OG TRK. This turns PNP transistor Q901 ON via inverter IC62 and resistor R901, operating the OG TRK relay "OG". Diode CR901 protects transistor Q901 from back emf spikes from the relay OG; resistor R902 ensures proper turn-off of the transistor. As soon as the relay OG operates, all leads from the SW MTX—T1, R1, SP1, S1—are switched through to the T, R, SP, S leads (see FIG. 10) which connect to the outgoing repeater in the external system. The ground on the S1 lead therefore appears on "S" lead, turning transistor Q202 on and ensuring that the OG trunk will appear busy to succeeding calls. With Q202 on, −10v at the collector of Q202 is connected via the OG TRK relay contact and resistor R903 to the base of transistor Q901, thus providing a holding path for Q901 and the OG TRK relay. The function of C606, R301 (FIG. 11) can now be explained. The OG TRK relay is initially operated by means of the ground on the "ST" lead, via Q301 (FIG. 8) and the decoder IC61 (FIG. 10) etc. However, as soon as the relay begins to operate, the ground will be broken away from the "ST" lead and transferred to the "S" lead; the function of C606 is to delay the removal of the drive signal until the relay has had time to fully operate—at which time it is held via Q202, R903, etc., (FIG. 10). When Q301 turns on, the delay on the operate signal to the decoder is relatively short, being determined by the time constant (R301×C606). However, when Q301 turns off, a much longer delay is introduced, being determined by the time constant [(R35+R301)×C606], where R35 is several times larger then R301.

As soon as the holding path to the OG relay has been established, the release of the OG trunk relay is under control of the ground on the "S" lead. On release, the ground disappears from the "S" lead and Q202 turns off, removing the drive to Q901 via R903. The delay in the ITM on release (discussed earlier) ensures that the OG TRK relay releases first, permitting the SW MTX relay to operate and release under so-called "dry" circuit conditions.

Release of the CCM for processing other calls will now be discussed. At the same time as the "EN" pulse was sent out, the "TIM" monostable IC65 (FIG. 6) was triggered on its "A" input from the "Q" output of EN monostable IC50 (FIG. 5). The width of the low-going pulse on the "Q̄" output of TIM monostable IC65 is determined by C34, R41 and is chosen to be greater than the worst case operate time of the OG TRK relays. On the trailing edge of the pulse (i.e. high-going), a "1" pulse is produced by differentiator C37, R44 on the TIM lead. The "TD" monostable IC66 (FIG. 5) will not have been triggered because of not being in a test sequence, so there will be a "1" on pin IC67 (FIG. 6). Therefore, when the "TIM" monostable IC65 times out, i.e. after the OG TRK relay has operated, a "0" pulse will be produced at the output of NAND gate IC67, setting the "GDT" latch IC68. This gives a "1" to pin 5 of IC70. Since no fault has been encountered, the "FL" latch IC71 (FIG. 4) will not have been set and there will be a "1" on pin 6 of IC70. This produces a "1" on the output of IC72 (FIG. 7) via resistor R31, which triggers the "RST" (reset) monostable IC74 on its "A" input. This produces a low-going pulse (width determined by C29, R36) on its "Q̄" output, which connects to all latch reset inputs (R). In this way, at the end of the sequence setting-up the switching path, all latches are reset and the CCM proceeds to start looking for the next service request (INC TRK counter IC47 (FIG. 3) re-starts because "SCA" IC46 is reset, allowing clocking again through IC38).

Power reset is as follows.

When the power is initially turned on in the unit, capacitor C31 (FIG. 6) is discharged. This places a "O" (−10v) on the "B" trigger input of the "RST" monostable IC74, triggering the monostable which resets all latches, etc. It also connects to the "CD" input of the "TD" monostable IC66 (FIG. 5) holding that reset. Capacitor C31 charges through resistor R38, eventually removing the reset trigger.

A test call will now be described.

Activation of the "TE" lead to the ITM will be discussed first.

At pre-determined time intervals a "1" pulse is produced at the DECODE OUT pin 13 of IC35 (FIG. 3). The timing interval is produced internally in IC35 by dividing down the internal oscillator frequency determined by C3, R4 and R5. Selection of the time interval is achieved by strapping inputs A, B, C, D to O's or 1's. The binary number set up on A, B, C, D determines the number of counter stages included in the divider chain. Resistor R2 and capacitor C1 are the timing components of an internal monostable, determining the width of the output pulse at pin 13 (DECODE OUT).

The "1" pulse at pin 13 of IC35 sets the "TST" latch, IC60, via inverter IC75. This in turn sets the "TE" latch IC76 via inverter IC77 and differentiator C30, R37. The "0" at the output of IC77 (i.e. on the "TST" lead) forces pin 10 of NAND gate IC78 to a "1" cutting off the clock pulses to counter IC47 via OR gate IC49 and pin 5 of IC38. This stops the counter IC47 at the INC TRK it happens to be addressing when the timer, IC35, operates (i.e. random selection of tested INC TRK). The "1" from the output of the "TE" latch IC76 places a solid "0" on the enable (E) of decoder IC42, via NOR gate IC43. This sends a solid "0" to the addressed ITM on its "TE" lead, which should cause the ITM to start operating its "A" relay to ground the leads of the incoming trunk, this action having been discussed above.

The test sequence is reset if the incoming trunk is busy, as follows.

Figure 4:
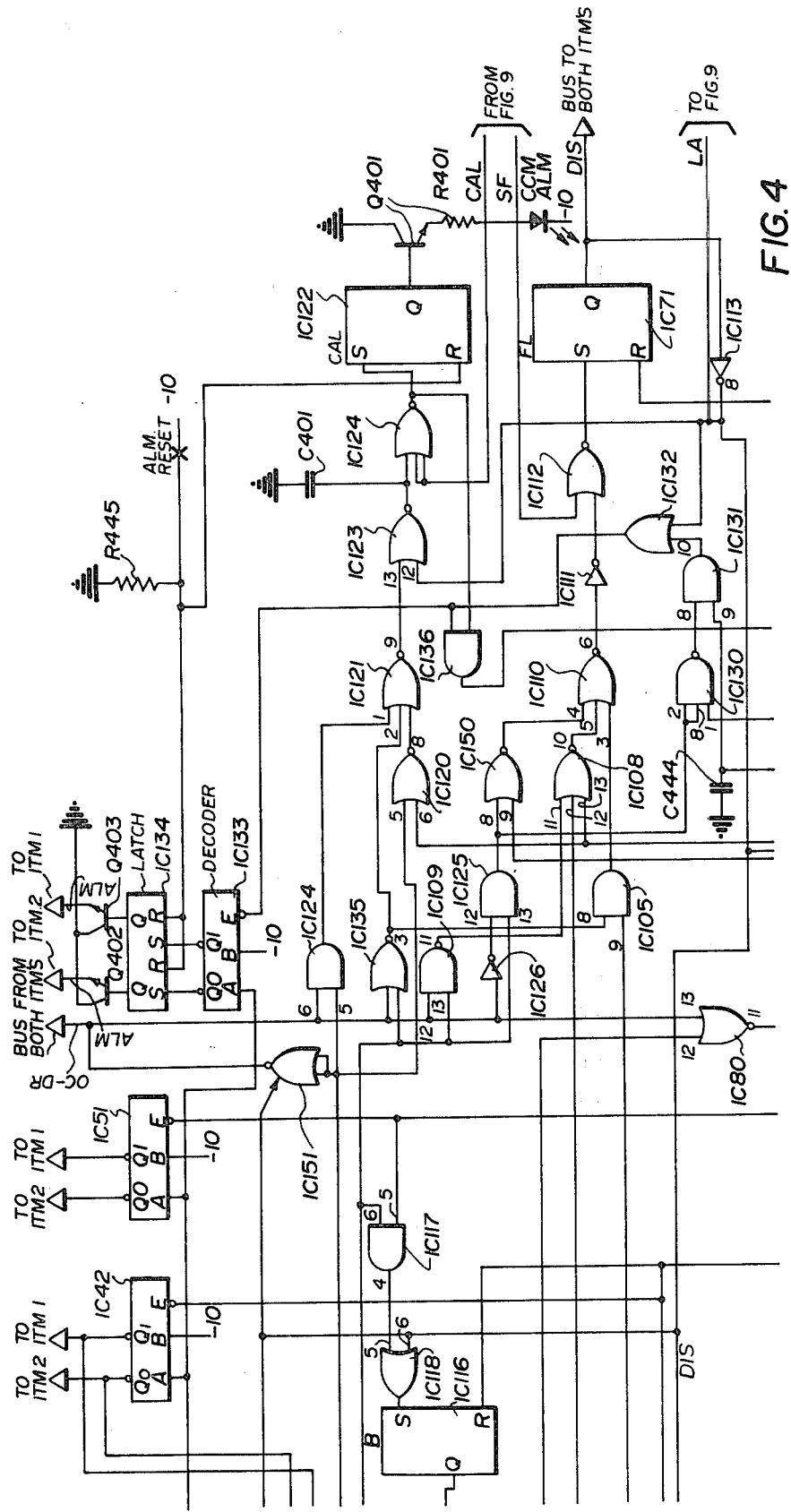

If the incoming trunk is busy, it will send back a "0" on the "OC-CR" bus to the CCM. This places a "0" on pin 13 of IC80 (FIG. 4). Since the "TST" latch has been set, there will also be a "0" on pin 12, giving a "1" on pin 11 of IC80 and on pin 5 of IC81 (FIG. 6). Pins 3 and 4 of IC81 will also be at "1's" ("FL" latch not set, "ENF" latch not set) so a "0" will be produced at pin 6 of IC81, triggering the "RST" monostable IC74 on its "A" input via NAND gate IC72. This resets the TEST SEQUENCE by resetting both "TST" and "TE" latches by the "0" pulse on their "R" inputs. The "TE" latch is reset via AND gate IC83.

It the INC TRK is idle, no signal should be returned on the "OC-DR" bus, but a "1" should be returned on the "RQ" lead. Initially, a short pulse will be returned on the "RQ" lead in response to the leading edge of the "TE" signal. This, however, will be ignored by the CCM, because when the "TST" latch IC60 is set, a "0" is placed on pin 9 of IC84. Initially, pin 8 of IC84 will also be at a "0" because capacitor C8 is discharged (previously pin 5 of IC85 was at a "1"). Therefore, pin 10 of IC84 will initially be at a "1", disabling multiplexer IC40 by means of its strobe input, ST. As soon as capacitor C8 has charged sufficiently through resistor R8, however, from the "0" on pin 5 of IC85 from the "TE" latch, pin 10 of IC84 will go to a "0", enabling multiplexer IC40. Resistor R8 and capacitor C8 are chosen so that by the time IC40 is enabled, the "A" relay should have operated (in the ITM), placing a solid "1" on the "RQ" lead. This "1" will set the "SCA" latch IC46 via IC44 and IC45 as soon as the clock goes to a "0" on pin 2 of IC45. When the SCA latch IC46 is set, the EN monostable IC50, (FIG. 5) is triggered, sending an "EN" signal to the addressed ITM, and the "TIM" monostable is triggered, in the same way as described previously. The ITM should start operating the pre-selected SW MTX relay in the same way as for a regular call.

An open circuit check will now be described.

Figure 9:
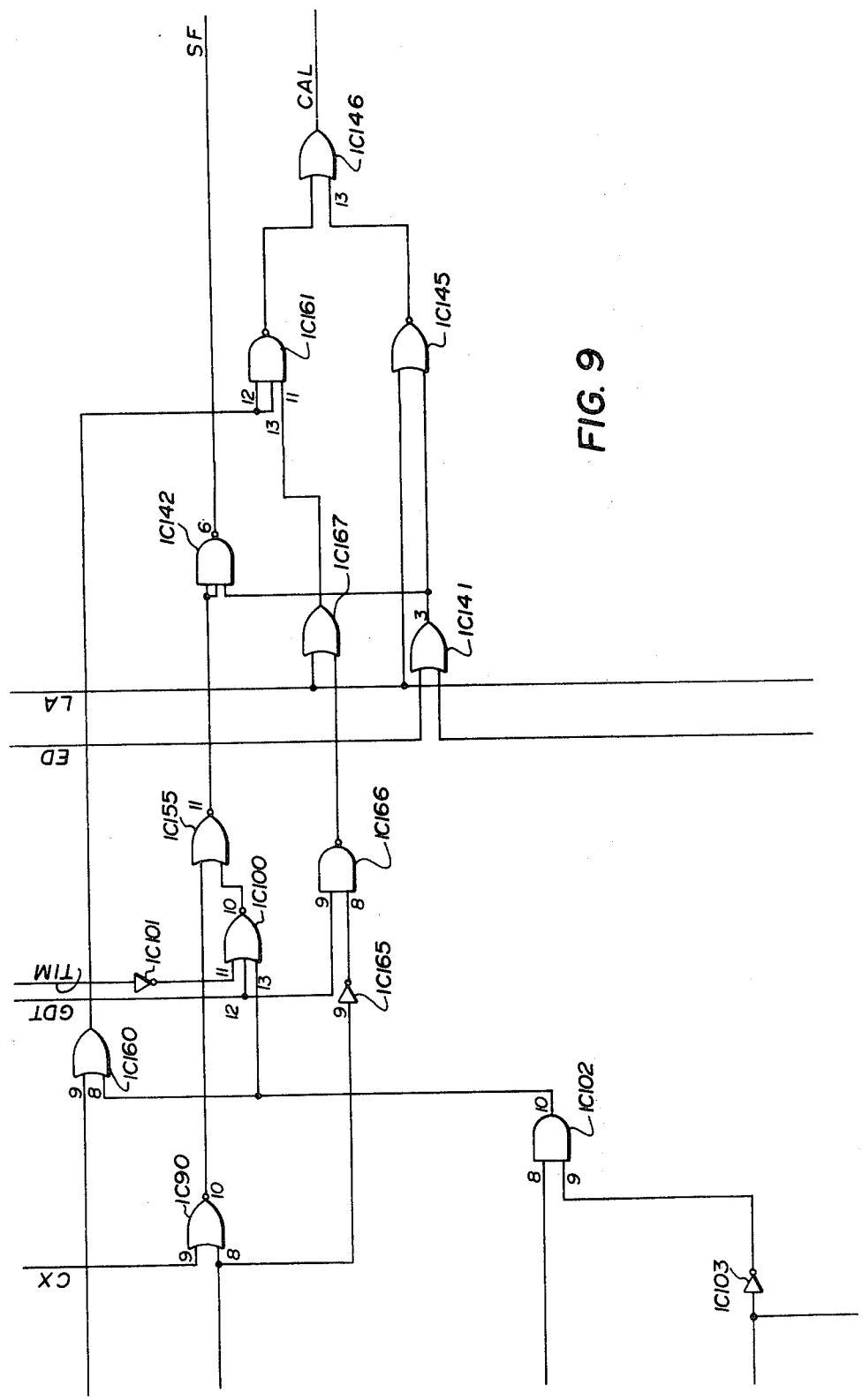

At the same time that the "EN" monostable is triggered, the "1" pulse from C26, R32 is NANDed with the "1" from the output of the "TST" latch by means of IC87 (FIG. 5), giving a "0" pulse on the "CX" lead to pin 9 of IC90, (FIG. 9). If the output from the "open circuit" comparators IC91 and IC92, connected to pin 8 of IC90, is a "1", indicating "open circuit" then pin 10 of IC90 will be forced to a "0" producing no pulse to initiate a fault locating sequence. This checks that none of the contacts of the selected SW MTX relay are shorted together. At the same time, the "A" relay in the ITM has operated, placing grounds on all four INC TRK leads T, R, SP, S, but the SW MTX relay has not yet had time to operate since the "EN" signal has only just been sent out. If any contact was shorted, a ground would be seen on one of the leads T1, R1, SP1, or S1 (FIG. 8).

Operation of the "open circuit" and "continuity" comparators, FIG. 8, will now be described.

Resistors R36 and R38 will form a potential divider, producing a potential of approximately −8v at their junction if resistors R29-R32 are open circuit at their other ends, i.e. the TT, RT, SPT, and ST leads. This is the condition when all leads T1, R1, SP1 and S1 are "open circuit". The values of R49, R50 and R51, forming another potential divider, are chosen such that the potential at the junction of R49 and R50 is slightly higher than −8v, and the potential at the junction of R50 and R51 is slightly lower than −8v. Therefore, when "open-circuit" the output of analogue compatator IC91 by itself would be a "1" since the inverting input (−) is slightly lower than its non-inverting input (+). Similarly, the output of analogue comparator IC92 by itself would also be a "1", since its non-inverting input (+) is slightly higher than its inverting input (−). Each comparator has an "open collector" output circuit (equivalent to an NPN transistor with no collector load resistor) so that the outputs of the two comparators can be wired together to a common load resistor, R47. Only when both outputs would by themselves be a "1" is a "1" produced when connected together. If any potential (other than −8v) is connected to any of the leads TT, RT, SPT, ST, then the potential at the input of the comparators will no longer be at −8v, and one of them will produce a "0" at the output. Only when all leads are "open circuit" will a "1" be produced.

The "continuity" comparators IC93 and IC94 function in exactly the same way, except that potential divider R52, R53, R54 has values chosen so that the "window" provided by R53 is centered around approximately −2v, instead of −8v. Resistors R29, R30, R31 and R32 are equal value resistors chosen so that when all leads TT, RT, SPT, ST are grounded then the parallel resistance of R29-R32 and R36 will also give a potential of −2v at the inputs of the comparators IC93 and IC94. Only when all four leads are grounded (indicating continuity of all leads through the SW MTX relay from the "A" relay grounds) will the output of the "continuity" comparators be a "1". Any lead which is "open circuit", or connected to any other potential, will cause the output to go to a "0".

The small "windows" provided by R50 and R53 allow for slight deviations from the theoretical, due to component tolerances, etc. Resistors R39-R42 limit the current into the inputs of the comparators should the inputs go outside of the 10v supply range, but have almost no effect on the voltage comparison because of the normally very high input impedance.

The "continuity" check will now be discussed.

When the "TIM" monostable IC65 (FIG. 6) times out, it produces a "1" pulse on the "TIM" lead via C37, R44, as described before. However, at this time, the "GDT" latch IC68 is not set, because there is a "0" on pin 3 of IC67 from the "Q̄" output of the "TD" monostable IC66 (FIG. 5). The "TD" monostable IC66 was triggered via IC95 at the same time as the "EN" was sent out, from the "1" on the "Q" output of the "EN" monostable and the "1" on the output of the "TST" latch IC60 (FIG. 3). The time interval of TD monostable IC66 (FIG. 5) is chosen to be slightly greater than that of the TIM monostable IC65 (FIG. 6).

The "1" pulse on the "TIM" lead gives a "0" pulse on pin 11 of IC100 (FIG. 9) via inverter IC101. Since the GDT latch has not operated, there is also a "0" on pin 12 of IC100 and the output will be determined by pin 13.

By this time, the SW MTX relay in the ITM should have operated so there should be "continuity" of all four leads and the output of the "continuity" comparators IC93 and IC94 (FIG. 8) should be a "1". Since there should be a ground on the "ST" lead, Q301 (FIG. 8) turns ON, producing a "1" on pin 9 of IC102 via inverter IC103. Therefore, the output of AND gate IC102, connected to pin 13 of IC100, should be at a "1", forcing pin 10 of IC100 to a "0" and preventing the initiation of a fault locating sequence.

De-activation of the "TE" lead to the ITM is accomplished as follows.

After the above described check has been made, the "TD" monostable IC66 (FIG. 5) will time-out, producing a "0" pulse at the junction of C36, R43 from its "Q̄" output. This re-triggers the "TIM" monostable IC65 (FIG. 6) on its "B" input, and resets the "TE" latch IC76 (FIG. 3) via AND gate IC83. The GDT latch IC68 (FIG. 6) will still not be set because the "TIM" pulse will have disappeared.

Resetting the "TE" latch IC76 will remove the "0" on the "TE" lead to the addressed ITM, via decoder IC42 (FIG. 4) and IC43 (FIG. 3). This in turn will cause the ITM to release the "A" relay removing the grounds from all four leads T, R, SP, S.

Reset of the test sequence and release of the CCM is as follows.

When the "TIM" monostable IC65 (FIG. 6) times out again, the GDT latch IC68 will be set (Q̄) output of TD monostable IC66, FIG. 5, is now back to a "1") and the "RST" monostable IC74 will be triggered, resetting all sequencing latches allowing the INC TRK counter IC47 to start scanning again, in the same way as at the end of a regular call set up sequence. The purpose in re-triggering the TIM monostable IC65 and waiting for its time out is to allow time for the "A" relay in the ITM to release before resetting the test sequence and allowing INC TRK scanning, so that the ground on the "S" lead from the "A" relay will not be seen as a regular call service request.

Checks and fault location while scanning for service requests will now be described.

While the INC TRK counter IC47 is scanning the ITM's and INC TRKs for service requests, it is interrogating each INC TRK with a "0" pulse on the corresponding "TE" lead. If the INC TRK is idle, a "1" pulse of similar duration should be returned immediately on the corresponding "RQ" lead. If the INC TRK is busy, then a "0" pulse of similar duration should be returned immediately on the "OC-DR" bus. If neither response is obtained, or if a response is obtained on *both* leads, then there must be a fault, either in the ITM decoder, multiplexer or random logic, or in the circuitry in the CCM which is monitoring for the response.

One possibility is no response on either the "RQ" or the "OC-DR" leads. The interrogation pulse subsequently routed to the "TE" lead of the addressed ITM by decoder IC42 (FIG. 4) appears on the enable input of the decoder and pin 5 of IC85. This produces a "1" pulse on pin 9 of IC105 (FIG. 4), and on pin 1 of IC106 (FIG. 3). Since the "TST" latch is reset, there is a "1"

on pin 2 of IC106 and therefore a "1" at the output, pin 3, forcing pin 11 of IC107 to a "0". This gives a "0" pulse to pin 12 of IC108. Pin 13 of IC108 is also at a 0 ("ENF" latch reset). If neither "RQ" nor "OC-DR" response is obtained, then pin 11 of IC108 will also remain at a "0", from pin 11 of IC109 (pin 12 of IC109 staying at a "1"—no "OC-DR" lead response, plus pin 13 of IC109 at a "1" (no "RQ" lead response via multiplexor IC40 and inverter IC44). This gives a "1" pulse to pin 5 of NOR gate IC110, forcing the output pin 6 to a "0" and setting the "FL" (fault-locating) latch IC71 via inverter IC111 and NOR gate IC112.

Functions of the "FL" latch will now be described.

Setting the "FL" latch does several things simultaneously. It places a "1" on the "DIS" bus to both ITM's, causing them to remove all logic signals sent to the CCM, and switching the circuits driving the corresponding leads to a high-impedance state, discussed previously. It stops the INC TRK counter IC47 (FIG. 3) at the address of the faulty INC TRK by cutting off the clock pulses via IC38 (Q output of "FL" latch at "1" gives "0" on pin 8 of IC78 via inverter IC113, forcing pin 10 of IC78 to a "1", giving a "1" on pin 5 of IC38 via OR gate IC49). It also re-activates the corresponding "TE" lead by a "1" pulse on pin 4 of IC43 via differentiator C32, R40 and NOR gate IC115, FIG. 5. Pin 4 of IC115 goes to a "1" because pin 6 is at a "0"—TST latch reset—and pin 5 is at a "0"—from "FL" latch via IC113. Still at the same time, it removes the "disable" from 3-state gates IC41 (FIG. 3) via pin 8 of IC113 (FIG. 4). Since the "B" latch IC116 is not yet set, the common enable (pin 12) of gates IC41 is at a "0" and therefore the "0" pulse on the "TE" lead will be "looped back", as a "1" pulse onto the corresponding "RQ" lead via one of the gates IC41. If the multiplexer IC40 and inverter IC44 are not faulty, then a "0" pulse will be returned on pin 6 of IC117 (FIG. 4) and therefore on pin 4 of IC117 and on pin 5 of IC118. Pin 6 of IC118 will also be at a "0" from the "FL" latch via IC113, so that the pulse at the output will set the "B" latch, IC116.

There will now be described the action of the circuitry in case of a fault in the CCM related to the "RQ" lead.

If the "B" latch IC116 is not immediately set as a result of the "looped back" "RQ" signal—indicating a fault in the CCM—then the "0" on pin 5 of IC120 together with the 0 on pin 6 ("ENF" latch reset) will produce a "1" on pin 8 of IC121, forcing pin 9 to a "0" and setting the "CAL" (CCM alarm) latch IC122 via IC123 (pin 12 of IC123 at a "0" from "0" on pin 8 of IC113) and IC124. Setting the "CAL" latch IC122 lights "CCM ALM" LED via emitter follower transistor Q401 and resistor R401.

If the "RQ" signal looped back is recognized by the CCM, then the "B" latch is set so quickly after the "FL" latch is set that pin 13 of IC123 goes to a "1" almost immediately after pin 12 goes to a "0". Any very short pulse that might get through IC123 to set the "CAL" latch is removed by a small capacitor C401.

When the "B" latch is set, it places a "1" on the common enable, pin 12, of gates IC41, (FIG. 3), forcing all outputs to a "0". This removes the "looped back" "RQ" signal and places a "looped back" "OC-DR" signal on the "OC-DR" lead via gate IC151 (FIG. 4).

The circuitry can recognize a fault in the CCM related to the "OC-DR" lead, as follows.

If the CCM does not recognize the looped back "0" on the "OC-DR" lead, then both inputs of IC124 (OC-DR lead and output of "B" latch) will be at a "1" giving a "1" to pin 1 of IC121 which forces the output to a "0" and sets the "CAL" latch and lights the CCM ALM LED as before.

An ITM fault may be related to either the "RQ" or "OC-DR" leads. If the CCM *does* recognize the "looped back" "0" on the "OC-DR" lead, then, since it has already checked the "RQ" response "looped back" and found it to be satisfactory (otherwise the "B" latch would have been set and a CCM ALM would have been activated), therefore the fault must be with the ITM. A "0" on the "OC-DR" lead will place a "1" on pin 12 of IC125 via inverter IC126. Provided the "RQ" lead has returned to a "0" there will also be a "1" on pin 13 of IC125, giving a "1" to pins 2 and 8 of IC130. Pin 1 of IC130 will also be at a "1" since the "ENF" latch is reset, so a "0" will appear on pin 8 of IC131 and thence on pin 10 of IC131. This gives a "0" on both inputs of IC132 (other input at a "0" from IC113) in turn giving a "0" to the "enable" of decoder IC133. Since the decoder IC133 is addressed to the same ITM by means of it "A" input, the "0" will be routed to the latch (part of IC134) corresponding to the faulty ITM. The latch will be set, placing a "1" on the corresponding "ALM" lead, via emitter follower transistor Q402 or Q403, to light the ITM alarm LED in the ITM.

Another possible fault is a response on both the "RQ" and "OC-DR" leads. If, when the ITM is interrogated, a response is obtained on *both* of these leads, then both inputs to IC135 will go to a "0" giving a "1" on pin 8 of IC105. This is ANDed with the "1" pulse on pin 9 (from the "TE" interrogation pulse) to give a "1" to pin 3 of IC110, forcing the output to a "0" and setting the "FL" latch as before. Exactly the same "loop-back" sequence is then initiated. If everything is satisfactory after the ITM is disabled, then the fault is in the ITM and the alarm is activated in an identical manner as before. If *both* "RQ" and "OC-DR" responses are still obtained simultaneously after setting the "FL" latch IC71 and "looping back", then the "1" at pin 3 of IC135 will force the output of IC121 to a "0" and set the "CAL" latch and light the "CCM ALM" LED, as before.

The CCM is released and the fault locating sequence reset on the occurrence of an alarm. When either a CCM or an ITM alarm is activated, a "0" pulse will appear at one of the inputs of IC136. This gives a "0" pulse to pin 11 of IC72 (FIG. 6), forcing the output to a "1" and triggering the "RST" monostable IC74. This resets all the sequencing latches and allows the counter IC47 to continue scanning the INC TRKS. Checks and fault location are also carried out while setting up a switching path. When the CCM recognizes a service request and starts setting up a switching path by placing a "0" on the "EN" lead of the addressed ITM, several checks are made at the same time, as will now be described.

A check is made of the latched OG TRK address returned from the ITM. When the "EN" lead is activated, the ITM loads the OG TRK address into its latches IC4 (FIG. 1) after a very small delay, and returns the latched-in address (inverted) on the OC-1, 2, 4 bus leads, as discussed before. Digital comparator IC140 (FIG. 11) is connected to the inverted OT-1, 2, 4 bus leads (inputs A0, A1, A2) and the OC-1, 2, 4 bus leads (inputs B0, B1, B2).

One inversion of the "OT" leads in the CCM, and one inversion of the "OC" leads in the ITM make the comparison a valid one. When the binary word on the "A" inputs of the comparator exactly matches the word on the "B" inputs, then the (A=B) OUT output will go to a "1" (fourth bit A3, B3 is not used and is strapped to ground; other inputs are only used when comparators are cascaded for words larger than four bits and are either strapped to ground or −10v).

If the address returned on the "OC" leads does not match, then the output of the comparator will stay at a "0" when the "ED" lead ("EN" with leading edge delayed by a small amount to match the delay in the ITM) goes to a "0". This produces a "0" pulse at pin 3 of IC141 (FIG. 9) forcing pin 6 of IC142 to a "1" and setting the "FL" latch via the "SF" lead and IC112 (FIG. 4). As soon as the "FL" latch is set, the gates in the ITM are disabled as before, but three state gates IC143 (FIG. 11) are enabled, "looping-back" the OT-1, 2, 4 leads (inverted) onto the OC-1, 2, 4 leads. If the fault still persists—indicating a CCM fault—then the output of the comparator will stay at a "0" and there will now be a "0" on both inputs of IC145 (FIG. 9) since the "LA" lead from the "FL" latch via IC113 (FIG. 4) will now be at a "0". This gives a "1" at pin 13 of IC146, forcing the output to a "1" and setting the "CAL" latch via the "CAL" lead and IC124 (FIG. 4). This lights the CCM ALM LED as before. If the address "looped-back" matches, implying that the fault is in the ITM, then there will be no "1" at pin 13 of IC146 and the "CAL" latch will not be set. In this case, no alarm will be set until the "GDT" latch is set. Although a fault has been detected, the "TIM" monostable will still have been triggered when the "EN" pulse was sent out, and when the "TIM" monostable times out, the "GDT" latch will be set as before. When the GDT latch IC68 (FIG. 6) is set, a "0" is placed on pin 9 of IC131 (FIG. 4) via inverter IC147 and resistor R402. This gives a "0" on pin 10 of IC131. Since the "FL" latch is set, both inputs of IC132 are at "0" and the decoder IC133 is enabled, activating the corresponding ITM ALM as described before. If a CCM alarm had been detected, the ITM alarm would not have been actuated in this way, because the CCM alarm would have triggered the "RST" monostable, resetting the sequence before the "TIM" timed out and set the "GDT" latch. Actually, when the "RST" monostable is triggered, it resets the "TIM" monostable immediately via its "CD" input causing a "1" pulse via C37, R44 at pins 4 and 5 of IC67, but this cannot set the "GDT" latch, because the latch is simultaneously being held reset on its "R" input.

A check of conditions on the "RQ", "OC-DR" leads is also made after loading the ITM. When the "EN" lead is activated, the ITM should remove the "1" from its "RQ" lead and place a "0" on the "OC-DR" bus as discussed before. If the CCM continues to see a "1" on the corresponding "RQ" lead, there will be a "0" on pin 13 of IC125 (FIG. 4) via multiplexer IC40 and inverter IC44 (FIG. 3) If the CCM continues to see a "1" on the "OC-DR" bus, there will be a "0" on pin 12 of IC125 via inverter IC126. Either fault condition will produce a "0" on pin 8 of IC150 which, together with the "0" on pin 9 of IC150 from the delayed "EN" signal ("EN" monostable $\overline{Q}$ output and IC54) will give a "1" to pin 4 of IC110, forcing the output to a "0" and setting the "FL" latch via IC111 and IC112.

As soon as the "FL" latch is set, the gates in the ITM will be disabled by means of the "DIS" lead as before. This time, however, since the "O" pulse from the $\overline{Q}$ output of the "EN" monostable IC50 will not yet have disappeared, there will be a "0" on pin 5 of IC117 and therefore a "0" on pin 5 of IC118. Since the "FL" latch is set, there will also be a "0" on pin 6 of IC118 via IC113. This produces a "0" pulse at the output, immediately setting the "B" latch IC116. This causes "O" on the "OC-DR" lead to be "looped-back" via IC151. If the CCM continues to see a "1" on the "OC-DR" lead, then there will be a "1" on both inputs of IC124 (pin 5 at a "1" from the "B" latch) giving a "1" to pin 1 of IC121, forcing the output to a "0". Since the "FL" latch is set, there will be "0's" on both inputs of IC123 and the "CAL" latch will be set via IC124 and the CCM ALM LED lit, as before. If the CCM continues to see a "1" on the "RQ" lead (but there is no fault with the "OC-DR" lead) then there will be a "0" on both inputs of IC135 giving a "1" to pin 2 of IC121—forcing the output to a "0" and activating the CCM alarm as before.

If, after the "FL" latch is set, the correct conditions are seen on the "RQ" and "OC-DR" leads, then no CCM alarm will be activated, and, as described before, an ITM alarm will be activated when the "TIM" monostable times out setting the "GDT" latch.

Checks and fault location are also made while making a test call. For example, a check for service request is made after activating the "TE" lead. When the CCM has initiated a test call by activating the "TE" lead to the addressed ITM, it waits to allow for the operate time of the ITM "A" relay, as discussed earlier. After this delay, determined by R8, C8, FIG. 3, it looks to see if a service request ("1") has been returned on the "RQ" lead; if none is present then a fault must exist in the ITM or CCM.

After the "TE" latch is set, a "1" is produced at pin 12 of IC107 via IC43 and IC85 after the delay determined by R8, C8. This forces the output of IC107 to a "0" giving a "0" to pin 12 of IC108 (FIG. 4). If no "1" has been returned on the "RQ" lead, then pin 13 of IC108 will also be at a "0", since the "EN" monostable will not have been triggered, and the "ENF" latch will not have been set. Also, both inputs of IC109 will be at a "1" forcing pin 11 of IC108 to a "0". The "OC-DR" lead on pin 12 of IC109 must be at a "1", since otherwise it would indicate a busy INC TRK, and this would have immediately reset the test sequence before time out of R8, C8. Since all three inputs of IC108 are at "0", a "1" will be produced at pin 5 of IC110, forcing the output to a "0" and setting the "FL" latch IC71 via IC111 and IC112. Now, with the "FL" latch set, signals are "looped-back" first onto the "RQ" lead and then onto the "OC-DR" lead to determine whether the fault is in the ITM or the CCM in an identical manner to that described previously, except that the "TE" lead is not reactivated from IC115, C32, R40, because pin 6 of IC115 is now at a "1" from the output of the "TST" latch keeping the output at a "0". It is unnecessary to re-activate the "TE" lead because the "TE" latch IC76 (FIG. 3) is keeping a solid "0" on it via pin 3 of IC43.

A check is also made on the OG TRK address and the "RQ" and "OC-DR" leads after loading of the ITM. If the CCM *does* see a service request on the "RQ" lead, then it will activate the corresponding "EN" lead and make exactly the same checks as discussed before. That is, it will check that the address returned on the OC-1, 2, 4 leads matches the address sent to the ITM on the OT-1, 2, 4 leads and it will check that the service request has been removed and the "OC-DR" lead activated. If any condition is not met, then it will set the "FL" latch IC71 and make the "loop-back" tests and activate the appropriate alarm as described before. The only difference is, that if an ITM fault is diagnosed, the "GDT" latch will not be set and an ITM alarm activated until the "TIM" monostable has timed out a second time, i.e. after the "TD" monostable has timed out.

A check is also made on the SW MTX contacts for "open circuit" and "continuity". When the service request is returned from the ITM, the "1" pulse from C26, R32 that triggers the "EN" monostable IC50 (FIG. 5) also appears on pin 2 of IC87. With the "1" on pin 1 of IC87 from the "TST" latch, a "0" pulse is produced on the "CX" lead to pin 9 of IC90 (FIG. 9). At this time, the output of the "open circuit" comparators IC91 and IC92 appearing on pin 8 of IC90 should be at a "1" indicating "open circuit" of all four leads T1, R1, SP1, S1. If, instead, pin 8 of IC90 is at a "0" then a "1" pulse will be produced at the output, forcing pin 11 of IC155 to a "0" and giving a "1" pulse on the "SF" lead via IC142 to set the "FL" latch via IC112 (FIG. 4).

When the "TIM" monostable times out, it produces a "0" pulse on pin 11 of IC100 (FIG. 9) via the "TIM" lead and inverter IC101. The "GDT" latch will not yet have been set, so there will also be a "0" on pin 12 of IC100.

At this time, there should be a "1" on pin 13 of IC100 from IC102, indicating "continuity" or grounds on all four leads T1, R1, SP1, S1. If, instead, pin 13 is at a "0" then pin 10 of IC100 will go to a "1" forcing pin 11 of IC155 to a "0" and setting the "FL" "latch", as before.

If either of the above faults are encountered (leads *not* open circuit or continuous at the appropriate times) then the "FL" latch is set, as described, and a "0" will be placed on the "GX" lead via IC156 and IC157 (pin 2 of IC157 at a "0" from the "FL" latch via IC113, pin 8 at a "0" from the "ENF" latch via IC55 and pin 1 at a "0" from the "GDT" latch IC68 which is not yet set). A "0" on the "GX" lead will turn on PNP transistors Q804-Q807 (FIG. 8) via R21, R23, R25, R27, respectively. This places grounds on all four leads TT, RT, SPT and ST. Resistors R22, R24, R26 and R28 ensure that transistors Q804-Q807 turn off properly. If the CCM still does not recognize a "continuity" condition, the output of IC102 (FIG. 9) will remain at a "0", giving a "0" on pin 8 of IC160. Since the "GX" lead connected to pin 9 of IC160 is also at a "0", then a "0" will be produced on pins 12 and 13 of IC161, forcing the output to a "1" and putting a "1" on the "CAL" lead via IC146. This sets the "CAL" latch via IC124 (FIG. 4) lighting the CCM ALM LED as described previously.

If the CCM *does* recognize the "looped-back" "continuity" condition, the CCM ALM will not be activated, since pin 10 of IC102 will be at a "1". In this case, no alarm will be activated until the "GDT" latch is set when the "TIM" monostable times out a second time. Then, pin 1 of IC157 goes to a "1", forcing the output to a "0" and removing the "0" from the "GX" lead via IC156. This turns transistors Q804-Q807 (FIG. 8) off, removing the "looped-back" grounds from TT, RT, SPT, ST. Now the CCM should recognize an "open circuit" condition because, by the time the "GDT" latch is set, the "A" relay in the ITM will have released, removing the grounds from the four leads. If the CCM still does not recognize an "open-circuit" condition, then pin 9 of IC165 (FIG. 9) will be at a "0", giving a "1" to pin 8 of IC166. Pin 9 of IC166 will also be at a "1" from the "GDT" latch via the "GDT" lead. This gives a "0" to one input of IC167, giving a "0" to pin 11 of IC161, since the other input to IC167 is also at a "0" from the "FL" latch via IC113 (FIG. 4) and the "LA" lead. This forces the output of IC161 to a "1", setting the "CAL" latch and lighting the CCM ALM LED via IC146, "CAL" lead and IC124 (FIG. 4), as before.

If the CCM does recognize an "open circuit" condition, then the "CAL" latch will not be set, since pin 9 of IC165 will be at a "1" locking the output of IC166 to a "1". Now, since the "GDT" latch has been set, indicating the completion of the sequence, and no CCM alarm has been activated (if it had been it would have immediately triggered the "RST" monostable, resetting all latches) then the fault must be in the ITM (i.e. CCM recognizes "continuity" and "open circuit" conditions satisfactorily). In this case, the "1" at the output of the GDT latch IC68 (FIG. 6) will produce a "0" at one input of IC132 via IC131, R402 and IC147. The other input of IC132 is also at a "0" from the "FL" latch via IC113 so decoder IC133 is enabled and an ITM ALM activated as described previously. The purpose of R402 (FIG. 6) in combination with C444 (FIG. 4) is to provide a small delay before setting the ITM alarm. This is necessary to allow sufficient time for a CCM alarm to be activated if, after setting the "FL" latch IC71, the CCM did not recognize an "open-circuit" condition (as described before). If there were no delay, an ITM alarm would be set as soon as the "GDT" latch was set. With the delay, the CCM alarm has time to be set first. Then, as soon as the CCM alarm is set, it triggers the "RST" monostable IC74, resetting the "GDT" latch and so preventing erroneous alarm. The ITM alarm should only be set if there is no CCM alarm triggered.

Operating the "alarm reset" button (top of FIG. 4), places a "0" on the reset inputs (R) of alarm latches IC134 and IC122. This resets any CCM or ITM alarm conditions, extinguishing the corresponding alarm LEDs. Normally the reset inputs are held to a "1" by resistor R445.

Any suitable commercially available CMOS (Complementary Metal Oxide Semiconductor) integrated circuits may be used for the gates, inverters, latches, etc., but, for convenience, the larger items may be as follows:

IC4—MC14508 CP
IC18—MC14028 CP
IC13—MC14502 CP
IC6—MC14512 CP
IC10—MC14028 CP
IC35—MC14536 CP
IC36—MC14027 CP
IC40—MC14539 CP
IC46—CD4044 AE
IC47—MC14024 CP
IC60—CD4044 AE
IC76—CD4044 AE
IC42—MC14556 CP
IC51—MC14556 CP
IC116—CD4044 AE
IC133—MC14556 CP
IC134—CD4044 AE
IC122—CD4044 AE
IC71—CD4044 AE
IC50—MC14528 CP
IC34—MC14024 CP
IC66—MC14528 CP
IC65—MC14528 CP
IC53—CD4044 AE

IC68—CD4044 AE
IC74—MC14528 CP
IC91 through IC94—LM339
IC61—MC14028 CP
IC30—MC14512 CP
IC140—MC14585 CP All part numbers commencing with "MC" are manufactured by MOTOROLA and those commencing with CD are by RCA. LM339 is by NATIONAL SEMICONDUCTORS.

For all IC's, except IC18, $V_{dd}$=GND (OV) and $V_{ss}$=−10v. For IC18, $V_{dd}$=−10v and $V_{ss}$=−22v.

What I claim as my invention is:

1. An electronic trunk selector for selectively connecting any one of a plurality of incoming trunks to any one of a plurality of outgoing trunks, the incoming trunks being connected to at least one incoming trunk module (ITM) and the outgoing trunks being connected to a common control module (CCM), the CCM having means for sending to the ITM sequential addresses of incoming trunks and the ITM having means for sensing if an incoming trunk is requesting service and for sending to the CCM a signal on a first lead to indicate that the incoming trunk is requesting service when that incoming trunk is addressed by the CCM and means for sending signals on a second lead to the CCM regarding the busy/idle status of an addressed incoming trunk, said CCM having means for periodic random testing of idle incoming trunks whereby it causes the ITM to connect the idle incoming trunk to an idle outgoing trunk pre-selected by the CCM and checks said first lead to see if it indicates a request for service and checks said second lead to see if it indicates a busy status of the incoming trunk.

2. An electronic trunk selector as claimed in claim 1 wherein the ITM includes latch and inverter means for storing, in response to an EN signal from the CCM, the address of the outgoing trunk pre-selected by the CCM and for returning to the CCM as confirmation an inverted version of the address of the outgoing trunk.

3. An electronic trunk selector as claimed in claim 2 including means responsive to said latch means for operating a switch matrix relay to connect an incoming trunk requesting service to the input of an outgoing trunk relay in the CCM corresponding to a pre-selected outgoing trunk.

4. An electronic trunk selector as claimed in claim 1 wherein each time the CCM sends to the ITM an address of an incoming trunk it also sends a short interrogation pulse on a third lead, the ITM having means responsive to said interrogation pulse to send reply signals on said first and second leads and the inverted address of the outgoing trunk.

5. An electronic trunk selector as claimed in claim 4 wherein testing of an idle incoming trunk is achieved by the CCM putting a continuous signal on said third lead to the ITM which operates an A relay in the ITM to ground the leads of the incoming trunk, said CCM having means for testing for the presence of grounds on said leads of the incoming trunk.

6. An electronic trunk selector as claimed in claim 5 wherein the A relay causes a continuous signal on said first lead to be sent to the CCM unless a fault exists in the CCM or ITM in which case the CCM diagnoses a fault and initiates a fault locating sequence to determine if the fault is in the CCM or the ITM.

7. An electronic trunk selector as claimed in claim 6 wherein, if a fault is detected, the CCM sends a disable (DIS) signal to the ITM and loops back signals on said first and second leads and on outgoing trunk address lines to see if the fault still persists in which case a CCM alarm is activated and, if not, an ITM alarm is activated.

8. An electronic trunk selector as claimed in claim 7 wherein the CCM includes means for checking for open circuits on the leads of the incoming trunk after operation of the A relay but before operation of the switch matrix relay and means for checking for grounds on the leads of the incoming trunk after operation of the switch matrix relay, a not true result for either check causing the CCM to initiate a fault locating sequence.

9. An electronic trunk selector as claimed in claim 4 wherein the CCM includes means for detecting faulty return from the ITM of signals on said first and second leads to initiate a fault locating sequence to determine if the fault is in the CCM or the ITM.

10. An electronic trunk selector as claimed in claim 9 wherein, if a fault is detected, the CCM sends a disable (DIS) signal to the ITM and loops back signals on said first and second leads and on outgoing trunk address lines to see if the fault still persists in which case a CCM alarm is activated and, if not, an ITM alarm is activated.

11. An electronic trunk selector as claimed in claim 10 wherein activation of the CCM alarm or ITM alarm resets the CCM to start scanning incoming trunks again.

12. An electronic trunk selector as claimed in claim 2 wherein the CCM includes means for detecting an incorrect inverted address from the ITM to initiate a fault locating sequence to determine if the fault is in the CCM or the ITM.

13. An electronic trunk selector as claimed in claim 12 wherein the CCM includes means for checking, after the ITM latch means have stored the address of the pre-selected outgoing trunk, whether the request for service has been removed from said first lead and whether a busy status indication is present on said second lead and, if not, initiating a fault locating sequence to see if the fault is in the CCM or the ITM.

* * * * *